Sept. 8, 1959 C. P. PORTERFIELD 2,903,555
ELECTRODE POSITION CONTROL FOR SPARK MACHINING APPARATUS
Filed March 11, 1957 3 Sheets-Sheet 1
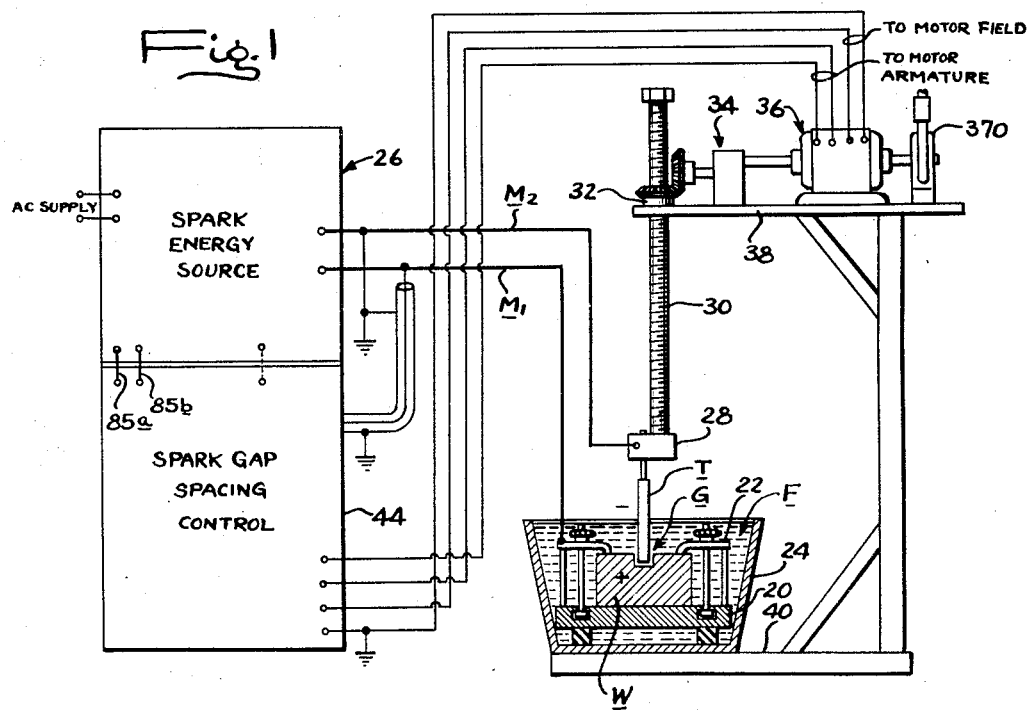
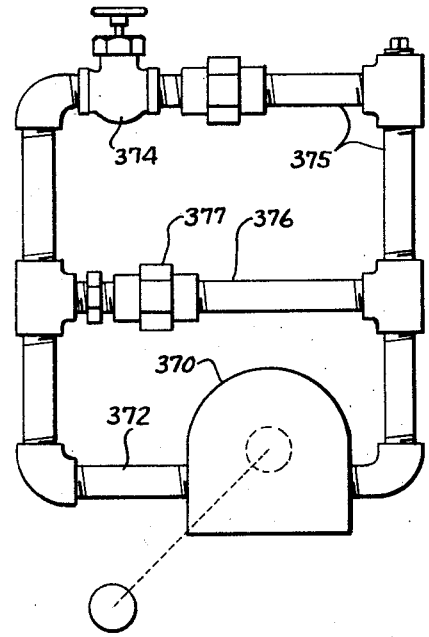
INVENTOR
CECIL PAUL PORTERFIELD
ATTYS.

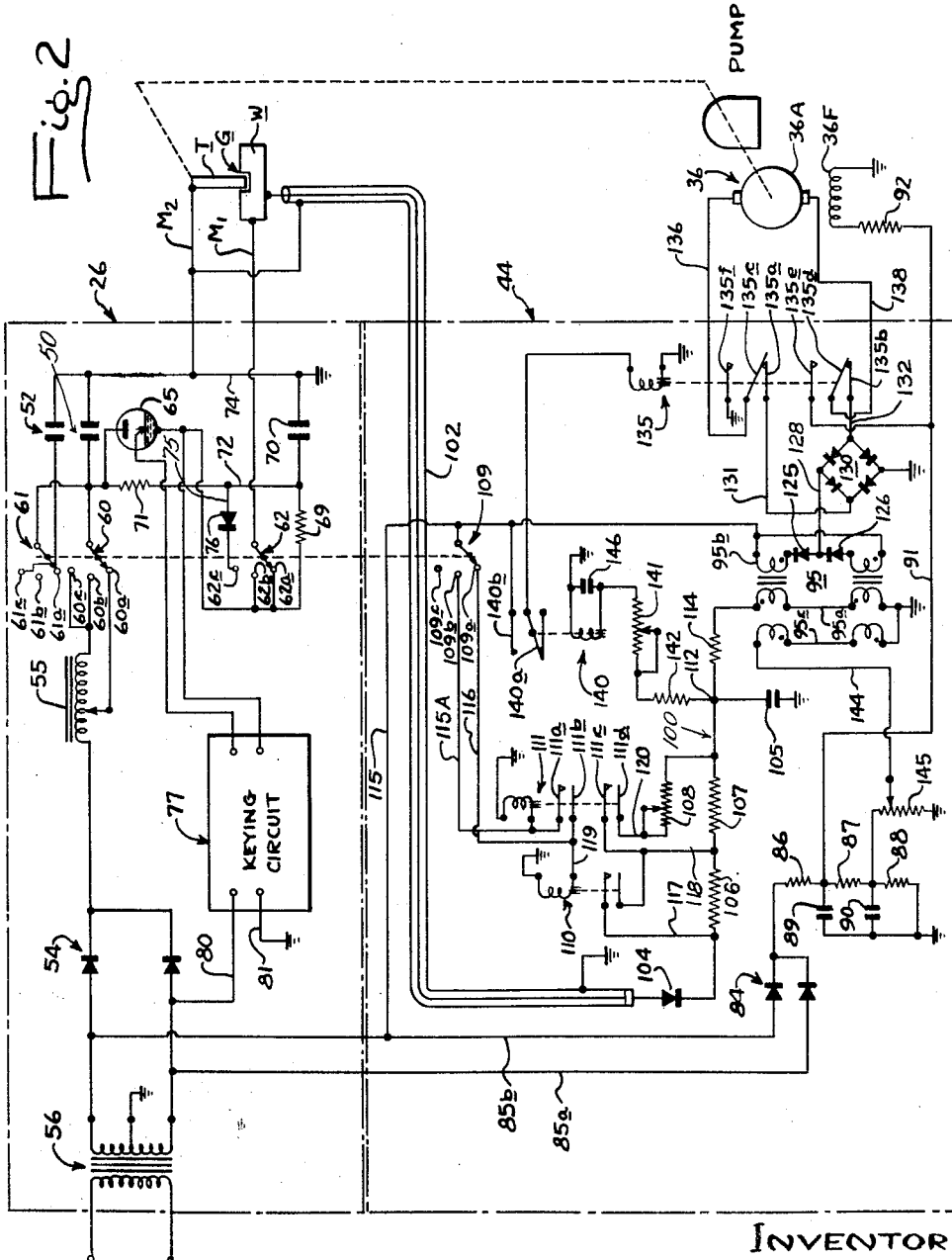

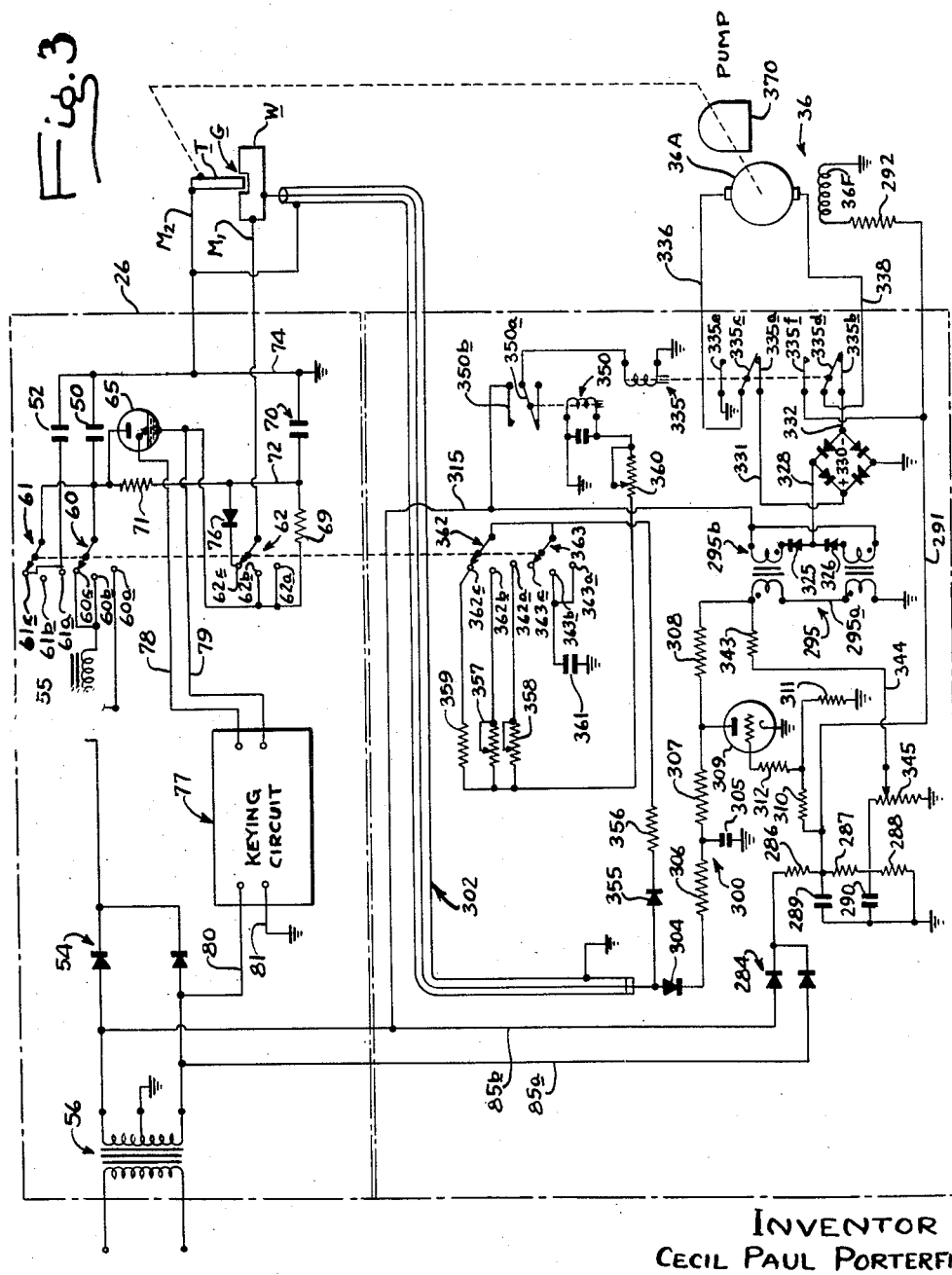

United States Patent Office 2,903,555
Patented Sept. 8, 1959

2,903,555

ELECTRODE POSITION CONTROL FOR SPARK MACHINING APPARATUS

Cecil Paul Porterfield, Pittsburgh, Pa., assignor to Firth Sterling Inc., Pittsburgh, Pa., a corporation of Pennsylvania Application March 11, 1957, Serial No. 645,355

13 Claims. (Cl. 219—69)

The present invention relates generally to the art of spark machining, often referred to as electro-erosion, in which particles of the material of a conductive workpiece are dislodged therefrom by overvoltage-initiated, time-spaced, spark discharges through a dielectric medium in a spark gap maintained between an electrode-tool and the conductive workpiece. More particularly the invention relates to the control of the relative positions of the electrode-tool and the workpiece so as to effect optimum physical spacing therebetween to insure maintenance of the desired operating spark gap.

It will be apparent that in the design of spark machining or electro-erosion devices, one of the most stringent requirements is that there be provision of means for relatively positioning the electrode-tool and the workpiece, the proper design of which requires many factors to be taken into account. One of these factors is the obtaining of information for directing the operation of the means to be included in the machine for physically effecting the positioning of the electrode-tool and the workpiece. Inherent in this factor and the thing making it a particularly complex problem is the wide variations in pulse repetition rates and pulse durations which are to be encountered in the spark machining operation. Not only can spark erosion be utilized for the rapid removal of workpiece material, but also for maintaining high standards of accuracy and fine finish. Increased spark power results in high current sparks for rapid material removal and decreased spark power at increased repetition rates produces a finer finish. Further, it will be appreciated that an infinite number of electrode-tool forms are usuable in a particular machine, depending on the job to be accomplished. Thus, not only is the matter of spark power of concern, but such mechanical considerations as the size and weight of electrodes, the rate of feed, the form and inertia of the components of the positioning means and the like must be taken into account.

Accordingly it is an object of the present invention to provide means for automatically and continuously controlling the spark gap spacing between an electrode-tool and a workpiece. A more specific object is to provide means which is continuously operable to insure the maintenance of the spark gap at a predetermined optimum spacing as determined by the utilization of the applied impulse between the workpiece and the electrode-tool.

A further object of the invention is to provide an electrode-tool feed for a spark-machining device which includes an electric drive motor, the operation of which is affected by a magnetic amplifier under the control of a signal derived from the applied impulse between the work piece and the electrode-tool.

Still another and related object lies in the provision of means for deriving a control signal, which means is capable of accommodating the wide variation of impulse energy encountered between open circuit, normal cutting, and short circuit conditions encountered during operation.

Yet another object is to provide an electrode-tool feed means for accommodating a wide range of electrode-tool weights without overrun and without necessitating reduction in the sensitivity or gain of the control system.

The objects of the invention thus generally set forth, together with other objects and ancillary advantages, are attained by the construction and arrangement, shown by way of illustration, in the accompanying drawings, in which:

Figure 1 is a diagrammatic representation of a spark machining apparatus embodying the features of the present invention.

Fig. 2 is a schematic circuit diagram of the electrical components of the apparatus shown in Fig. 1.

Fig. 3 is a schematic circuit diagram of the electrical components of an apparatus like that shown in Figure 1, but incorporating an alternative form of spark gap spacing control means.

Fig. 4 is an elevational view, partly schematic, of an hydraulic means for damping feed motor overrun.

While the invention is susceptible of various modifications and alternative constructions, there is shown in the drawings, and will herein be described in considerable detail, a preferred embodiment. It is to be understood, however, that it is not thereby intended to limit the invention to the specific form disclosed. On the contrary, the intention is to cover all modifications and alternative constructions falling within the spirit and scope of the invention, as expressed in the appended claims.

Referring more particularly to the drawings, there is shown in Fig. 1 a diagrammatic representation of a typical apparatus for performing a spark machining operation, in which apparatus the present invention is incorporated. The purpose of this figure is to assist in the understanding of the organization and operation of the apparatus generally. The novel and distinctive manner in which the operational requirements are met by the invention can also be better appreciated from a general consideration which will, of course, be expanded as the description proceeds. This functional system analysis, however, does not indicate that the parts of the system are separate and independent.

As shown, a workpiece W is mounted in place with respect to an electrode tool T for the performance of a spark machining operation thereon. For illustrative purposes, the spark machining operation depicted is one in which a hole or bore is to be formed in the workpiece W by repeated, short, overvoltage-initiated, spark discharges through a spark gap, indicated generally at G, maintained between the electrode tool T and the conductive workpiece W. The spark gap G is inundated with a fluid dielectric F. For this purpose, the workpiece W is fixed to a base 20, by any convenient means, such as screw clamps 22, and the base, with the workpiece in place thereon, is placed within a tank 24, which serves as a container for the dielectric fluid F.

The dielectric fluid F is maintained in the spark gap between the electrode-tool T and the work W to obtain the repeated, short, high-current spark discharges which have bene found effective for the attainment of practical machining rates and to avoid discharges of insufficient current density as might occur in air. The dielectric is necessarily capable of being ruptured in the presence of an overvoltage and in addition is capable of returning to its original state when the voltage is removed. Further, the dielectric serves to entrain particles removed from the workpiece and assists in removing the same from the immediate vicinity of the spark gap G.

When, as a result of the application of an energy impulse to the gap G, and the dielectric medium F therein is temporarily ionized, a spark discharge occurs which effectively removes a minute particle or particles of the workpiece. It will be appreciated that as each spark discharge occurs across the gap G to remove some of the workpiece material, the gap spacing is thereby increased, and the electrode-tool must be moved relative to the workpiece to maintain the spark gap spacing within an operating range in which the spark machine action is most effective. If the gap is closed by the tool advance or by the accumulation of dislodged particles, the resulting short circuit current may damage workpiece. If, on the other hand, the tool is allowed to space itself too great a distance from the workpiece, the applied voltage cannot ionize the dielectric and inefficient machining will result. As shown in Figure 1, the illustrative device incorporates means for translating or feeding the electrode tool T with respect to the workpiece W, together with a gap spacing control means generally indicated by a block outline 26, for controlling the feed means.

The feed means is arranged to feed or retract the electrode tool T with respect to the workpiece W. In the example shown here, T is mounted in a holder 28, which is carried by a feed screw 30. The feed screw 30 is adapted to be moved by means of a feed nut 32, having integrally formed therewith a bevel gear which serves as the terminal gear of a suitable transmission 34, by means of which the feed screw is operatively coupled to a feed motor 36. The feed mechanism has for convenience been shown as mounted on the cross arm 38 of a supporting structure which includes a column 39 and a base 40. The tank 24 may be conveniently mounted upon the base 40 so as to position the workpiece W, which is disposed therein, in the desired juxtaposed relation to the electrode tool T.

It will be appreciated that the specific form of the electrode-tool and the workpiece may vary widely. For example, the electrode-tool may be of a hollow tubular form, or it may be simply of cylindrical rodlike form (as shown), and designed to be axially fed with respect to the workpiece. Other applications might dictate a curvilinear form. But whatever the form that is required to produce the desired end result, it will be recognized that the relative positions of the electrode-tool and workpiece must be carefully held, since the spark machining or electro-erosion takes place at any given instant across the narrowest part of the maintained gap. In the particular illustrative embodiment, the active portion of the gap is designed to be the bottom surface of the electrode-tool T. It will be appreciated that so long as simple rectilinear movement of the tool is employed the cross-sectional form of the tool may be of any desired configuration, a splined outline or any other non-circular outline being as readily produced as a cylindrical bore. Further, if rotational movement is added, the tool may be employed to provide internal or external threads. For purposes of illustration here, however, the various relative postures that can be assumed by the electrode-tool and the workpiece have been simply represented as shown in Figure 1.

For purposes of illustration the spark energy source, generally indicated at 26, is shown connected to the electrode-tool T and to the workpiece W respectively, by way of the tool holder 28, and one of the hold-down clamps 22. The spark discharge energy source 26 has been illustrated in Fig. 2 in simplified schematic form. As there shown the spark discharge energy source includes means for effecting relatively high energy, overvoltage initiated, time-spaced spark discharges at a relatively low repetition rate; means for effecting relatively lower energy, overvoltage initiated, time-spaced spark discharges at the same relatively low repetition rate; and complementary additional means for effecting relatively low energy, overvoltage initiated, time-spaced spark discharges at a relatively higher rate. Each of these means includes a capacitive storage component continuously connected to a charging current source, together with means for alternatively completing the discharge of the capacitive storage components across the spark gap G that is maintained between the workpiece W and the electrode-tool T according to the desired metal removal rate.

As shown, a relatively large capacitive storage means is provided by a capacitor 50 having a capacitance of approximately 100 microfarads. A relatively larger capacitive storage means is provided by connecting in parallel with the capacitor 50 a capacitor 52 having a capacitance of approximately 200 microfarads, so that the overall capacitance of the parallel arrangement is approximately 300 microfarads. For charging the capacitive storage means 50 and 52 an alternating current or charging circuit, consisting basically of a full wave, single phase rectifier feeding a charging inductance is employed. The rectifier is indicated generally at 54 and is preferably of the center-tapped selenium type intended for continuous duty. The output of the full wave rectifier is preferably applied to a charging inductance 55 so that a nearly doubled unidirectional potential appears across the capacitors 50 and 52. The rectifier 54 is supplied from the secondary of a transformer 56, the primary winding of which may be connected to any suitable external alternating power supply for the machine.

As shown, a series of ganged switches is provided for the selective charging of the capacitors 50 and 52 and the connecting thereof with spark machining mains $M_1$ and $M_2$ which are respectively connected to the workpiece W and the tool T. As shown, three such switches are utilized, respectively designated 60, 61, and 62. In the illustrative device, the switches 60, 61, and 62 are of the rotary, single-pole, multiple-throw type, each having a movable contact and three fixed contacts. The respective fixed contacts are designated by the switch number followed by the suffix letters "a," "b," and "c."

In order to control the discharge of the capacitive storage means 50 and 52, the illustrative device employs an ignitron 65. The ignitron 65 comprises a mercury pool-cathode electron discharge device having therein means for initiating ionization so as to render the device conductive and discharge the capacitors 50 and 52.

For effecting relatively lower energy spark discharges at a substantially higher repetition rate there is included in the illustrative spark energy source a circuit of the modified relaxation type which includes capacitive storage means 70. The capacitive storage means 70, which may be on the order of 4 microfarads, is adapted to be charged through a resistor 71.

It will be seen that with the switches 61, 60, and 62 operated so that the movable contacts thereof are respectively in positions 61c, 60c, and 62c, the capacitor 70 is charged by way of the resistor 71, the line 72, from the charging circuit which includes the inductance 55 and full wave rectifier 54. In this instance the capacitor 50 serves to smooth any ripple appearing on the voltage applied to this relaxation circuit from the inductance 55, since in this condition of operation it will be seen that the capacitor 50 remains connected. The charging circuit is completed by way of a line 74 to ground and thence to the grounded center tap of the transformer 56.

The discharge path for the relaxation circuit includes the line 75 and thence by way of the contact 62c of the switch 62 to the spark machining main $M_1$ which is connected to the workpiece W, the discharge path being completed across the spark gap G to the other of the spark machining mains $M_2$ and thence to ground by way of the line 74.

The charge on the capacitor 70 would eventually approach the voltage of the source unless the spark gap G were maintained with a small enough spacing to assure sparkover for a disruptive breakdown at or below the level of the source voltage. Due to inherent distributed inductance of the discharge circuit there is a tendency for oscillation to occur therein. While this inherent distributed inductance is desirably made as small as possible, the rate of current flow upon discharge of the capacitive storage means 70 is of such large amplitude that momentarily stored inductive energy is by no means negligible. Thus, there is included in the discharge path, and more particularly in the line 75, a half-wave rectifier 76, having a high current rating, to permit the discharge current to flow in the normal direction, but to eliminate any negative half cycles. The inclusion of the half-wave rectifier 76 minimizes electrode-tool erosion holding the same to what might be termed normal cathode phenomena. Additionally by preventing a transient oscillatory current from flowing in the series circuit which includes the spark gap G and the capacitive storage means 70, the operation of the relaxation circuit is enhanced, and increased repetition rates are possible without initiating continuous conduction across the working spark gap G.

When the switches 60, 61 and 62 are operated to connect the movable contacts thereof with the contacts 61b, 60b and 62b, the discharge path for the relaxation circuit is interrupted. The charging path for the capacitor 50 is established but the capacitor 52 remains unconnected. Operation of the switch 62 so that its movable contact engages the contact 62b connects the cathode of the ignitron 65 to the spark machining main M₁ so that upon establishing conduction of the ignitron 65 the capacitor 50 is discharged therethrough and by way of the main M₁ to the workpiece W, the discharge path being completed across the spark gap G to the tool T and thence by way of the spark machining main M₂ back to the other side of the capacitor by way of the line 74. Similarly when the switches 60, 61 and 62 are operated so that the movable contacts thereof engage the fixed contacts 60c, 61c and 62c, respectively, the capacitor 52 is connected in parallel relation with the capacitor 50 so that its capacitance is added thereto, the charging circuit therefor is completed and since, as shown, the contact 62a and 62b of the switch 62 are connected together, the cathode of the ignitron 65 remains connected to the spark machining main M₁. Thus upon establishment of conduction of the ignitron 65, the combined capacitance of the capacitors 50 and 52 is discharged through the ignitron to the spark machining main M₁ and across the gap G to the spark machining main M₂ and thence to ground.

In order to render the ignitron 65 conductive, a keying circuit is employed in the instant device. The keying circuit per se has not been shown in detail since it forms no part of the present invention. For a detailed description of the operation thereof in the instant environment, reference is made to the copending application of Everard M. Williams and Cecil Paul Porterfield, Serial No. 579,623, filed April 20, 1956. Suffice it to say for present purposes, the output of the keying circuit comprises pulses of sufficient energy to place the ignitron 65 in conducting condition, and these pulses are such that there is one positive pulse for each half-cycle of the supply voltage so spaced with reference to the supply voltage that they occur approximately 20 electrical degrees before each source voltage zero or cross-over. Further these pulses are also of short duration but of high energy and are applied between the igniter and the cathode of the ignitron 65 by way of the lines 78 and 79 so as to properly phase the output pulses. The keying circuit 77 derives its input from lines 80 and 81 which are respectively connected to one of the legs of the secondary winding of the transformer 56 and to the ground.

The capacitor 70 performs a dual function in positions "a" and "b" of the switches 60, 61, and 62. In these positions of the switches the capacitor 70 is connected through a small series resistor 69 across the spark-gap G. Thus it affords a low impedance path to aid in starting ignitron conduction, the small resistor providing sufficient damping to prevent the circuit from performing as a two-mesh coupled network capable of superimposing undesirable transients on the basic current envelope of the discharge pulse.

Additionally in positions "a" and "b" of the switches, the ignitron fires into the capacitor 70 in the event of an open circuit condition of operation of the devce, i.e., when the spark-gap G is too wide to permit the applied voltage to ionize the gap dielectric. The voltage developed across the capacitor 70, then, is available to provide an "error" signal between the spark machining mains M₁ and M₂ during an open circuit condition so as to effect forward drive of the electrode-tool feed mechanism.

The foregoing description of the spark discharge energy source is relatively elemental in character and is included for the sake of understanding the present invention. For a more complete disclosure including a detailed illustration and description of typical circuitry which can be employed as the spark discharge energy source, reference is again made to the application of Everard M. Williams and Cecil Paul Porterfield, Serial No.. 579,623, filed April 20, 1956.

From the preceding discussion of the spark discharge energy source, it is apparent that there are two basic types of operation thereof. First, in the "a" and "b" positions of the switches 60, 61 and 62, which might conveniently be termed the high power positions, the spark energy source operates as a time-spaced pulse generator of cutting energy. In position "c" of these switches the spark energy source takes the form of a relaxation type unit. Thus, it will be appreciated that the type of signal that is available at the working gap G as provided under these two manners of operation varies widely.

In carrying out the present invention, the gap is maintained at the optimum operating spacing in response to a signal which is the integration of the gap voltage. A voltage integrating network is accordingly connected across the gap and the voltage signal is amplified by a magnetic amplifier to raise it to an adequate power level for controlling a feed motor. Because of the widely varying spark gap voltage signal, the input signal to the magnetic amplifier is modified to accommodate this variation in operating conditions. At the same time the sensing of a short circuit condition results in the immediate application of full voltage to the feed motor for maximum speed separation of the electrodes. This is important in preventing a maintained contact-initiated discharge which could physically damage the work piece due to high thermal gradients.

Referring particularly to the form of the invention illustrated schematically in Fig. 2 of the drawings, the feed motor 36, as shown, is of the direct current type having a field winding 36F which is adapted to be continuously energized. Accordingly a unidirectional voltage is connected between rectifiers 84 and ground. The rectifiers are conveniently connected through lines 85a and 85b to the ends of the secondary winding of the transformer 56, the winding center tap being grounded. The voltage divider comprises series-connected resistors 86, 87, and 88. Smoothing capacitors 89 and 90 are connected from the respective junctions of resistors 86, 87 and 87, 88, to ground. From the junction between the resistors 86 and 87 and by way of a line 91 which includes resistor 92, a D.C. voltage is applied to the field winding 36F and therethrough to ground.

The armature 36A of the motor 36 under forward or feed condition of operation is supplied with a voltage which comprises the output of a magnetic amplifier generally designated 95. The magnetic amplifier 95 provides an amplified voltage output which is under the control of a signal voltage derived as a result of integrating the voltage appearing across the spark gap G. For this purpose, the spark gap spacing control 44 includes an integrator circuit generally designated 100, which through an appropriate switching arrangement, provides integrator time constants to accommodate the several spark machining powers that are available from the spark energy source 26 so that during a normal spark machining operation at any one of such powers during desired cutting conditions, the average voltage across the integrator circuit is a substantially constant value. Then, if the gap voltage rises above such value, as would occur with too large a spacing between the tool T and the workpiece W, a signal is applied to the magnetic amplifier 95 to cause it to supply an increased forward or feeding voltage to the armature 36A of the motor 36. If the gap voltage falls slightly below such value, as would occur with a closer than optimum spacing between the tool T and workpiece W, then a signal is applied to the magnetic amplifier which causes its output to drop below the value corresponding to a desired cutting condition. In addition if the signal applied drops sharply, as will occur under a condition of intermittent operation or short circuit means is included to effect reversal of operation of the motor 36 so as to rapidly separate the tool T and the workpiece W, at the same time the output of the magnetic amplifier drops to its minimum level.

Gap voltage is supplied to the integrator circuit 100 by way of a line 102 and a half-wave rectifier 104. The line 102 may be of coaxial form with its central conductor connected between the spark machining main $M_1$, for the workpiece W, and the cathode terminal of the rectifier 104. Its outer conductor serves as a grounded shield and is tied to the spark machining main $M_2$.

The integrator circuit 100 includes a capacitor 105, resistors 106, 107 and 108 and a switching arrangement for selecting a combination of the resistors 106, 107 and 108 to provide a proper charging time constant for the capacitor 105 according to the spark machining powers selected by the operation of the switches 60, 61 and 62 in the spark energy source 26. Thus the switching arrangement includes a single pole, multiple position switch 109, which is ganged with the switches 60, 61 and 62 for operation in unison therewith. Additionally the switching arrangement includes relays 110 and 111. The integrated signal appears at the terminal 112 and is applied to the signal winding 95a of the magnetic amplifier 95 by way of a resistor 114.

With the ganged switches operated so that the movable contacts thereof respectively engage the fixed contacts bearing the designation "a," the device is conditioned for operation at maximum spark machining power as hereinbefore set forth. The movable contact of the switch 109 is connected by way of a line 115 to the supply line 85b. Thus supply line voltage is supplied from the movable contact arm 109 to the contact 109c, and thence by way of a line 116, to energize the coil of the relay 110. When this occurs the resistor 106 is shunted, i.e., eliminated from the integrator circuit, since the fixed contact of the relay 110 is connected directly to the plate of the rectifier 104 by way of a lead 117 and the movable contact thereof is connected to the junction between the resistors 106 and 107 by a lead 118. Thus in position "a" of the switch 109, a charging time constant for the capacitor 105 is determined by the value of the resistor 107.

When the switches 60, 61, 62 and 109 are operated into the "b" position, the spark energy source 26 is conditioned for intermediate power operation wherein the capacitive storage means 50 alone is utilized to supply spark machining power. In this position of the switch 109, the voltage from the line 115 is supplied by way of the movable contact of the switch 109 to the fixed contact 109b thereof and thence by way of a lead 115A to the coil of the relay 111 and to the fixed contact 111a thereof as shown. Thus the relay 111 is energized to close its contacts. The movable contact 111b of the relay 111 is connected by a lead 119 to the coil of the relay 110 so that when the switch 109 is operated into the "b" position, the relay 110 is also energized so as to close its contacts again shunting the resistor 106 by way of the leads 117 and 118. To the relay contacts 111c and 111d are connected, respectively, the leads 118 and 120. The lead 120 has its other end connected to the resistor 108 which is in the form of a potentiometer to permit adjustment of the value of resistance thereof. The other end of the resistor 108 is connected to the terminal 112. Thus, as a result of the operation of the relays 110 and 111, the resistance that is effective to determine the charging time constant of the integrator circuit for the intermediate power position is that as determined by the parallel connection of the resistances of the resistors 107 and 108.

When the switches 60, 61 and 62 are moved into the "c" positions thereof (as shown) the relaxation circuit of the spark energy source 26 becomes effective to supply spark machining power. In the "c" position of the switch 109 neither of the relays 110 or 111 are energized. The charging time constant of the integrator circuit therefore is determined by the sum of the resistances 106 and 107 which are connected in series.

It will be apparent therefore that there is provided an integrator circuit which correlates the charging time constant thereof to the spark machining power selected. Thus there is provided a control signal for the magnetic amplifier 95 which control signal is derived as a result of the integrated voltage appearing across the spark gap G.

The winding 95b of the magnetic amplifier 95 shown serves both as its excitation winding and also its output winding. The opposite ends of this winding are connected together, and one side of the A.C. supply (85b) by way of the line 115 is also connected thereto. The contiguous ends of the winding 95b are connected by means of half-wave rectifiers 125 and 126 so that the amplifier operates in push-pull condition. The output from the magnetic amplifier 95 is manifested by way of a line 128 across a rectifier bridge 130 to ground. From the rectifier bridge, by way of leads 131 and 132, a unidirectional voltage is applied to fixed contacts 135a and 135b of a reversing relay 135. The reversing relay 135 is normally de-energized and in such condition its movable contacts 135c and 135d are engaged with the contacts 135a and 135b, respectively. As a result the positive line 131 from the rectifier bridge 130 is connected to the motor armature by way of a lead 136, and the negative line 132 of the bridge 130 is connected to the motor armature by way of a lead 138 so as to effect forward or feeding operation of the motor 36 to feed the tool T of the illustrative device toward the workpiece W.

If the gap spacing becomes too small, then the gap spacing control operates to effect reversal of the direction of rotation of the motor 36 so as to rapidly withdraw the tool with respect to the work thereby to increase spark gap spacing. To this end means is provided for sensing a reduction in spark gap spacing below the desired range and for effecting operation of the reversing relay 135 so as to produce motor rotation in the opposite direction by properly applying full supply voltage thereto. As shown this means includes a relay 140 which has a movable contact 140a and a fixed contact 140b. The operating coil of the relay 135 has one end connected to ground and the other end connected to the movable contact 140a of the relay 140. The fixed contact 140b of the relay 140 is connected to the supply line 115. The relay 140, as shown, is adapted to be energized by a voltage derived from the integrated signal voltage. Thus its coil is connected by way of resistors 141 and 142 to the terminal 112. Preferably a capacitor 146 is connected across the coil of the relay 140 so as to provide a desirable delay in the action of the relay 140 and particularly to minimize the effect of steep wave fronts appearing across the relay inductance. The relay 140 is so chosen that the normal integrated signal for desired operation of the device provides sufficient energization for its coil so that the relay is held in, and thus its contacts 140a and 140b are maintained separated. Since the gap voltage drops when the spark gap spacing becomes too close, the voltage across the resistors 141 and 142 and coil of relay 140 drops. When this occurs insufficient energizing voltage is applied to the relay coil and the relay drops out. As a result its movable contact 140a engages the fixed contact 140b thereof to that supply voltage from the line 85b by way of the line 115 is applied to the coil of the relay 135 to energize this relay. When this occurs, the movable contacts 135c and 135d of the relay 135 break the connection between the lines 131 and 136 and between the lines 132 and 138. The relay 135 has an additional pair of fixed contacts 135e and 135f which are connected to the D.C. supply line 91 and to ground respectively. It will be recalled that the line 91 carries a D.C. voltage as derived from the voltage-divider and filter network 86—90. Thus when the relay 135 is energized, its movable contacts 135c and 135d are moved into engagement respectively with the fixed contacts 135f and 135e. As a result a positive D.C. voltage is applied to the armature lead 138 and the armature lead 136 is connected to ground. This, it will be apparent, effects a reversal of rotation of the armature 36A of the motor 36 to the end that the tool T is quickly withdrawn from the workpiece W, thereby increasing spark gap spacing and alleviating a short-circuit condition.

When spark gap spacing has been increased sufficiently far, the spark gap voltage again increases with the result that a larger signal appears at the terminal 112. The voltage developed across the resistors 141 and 142 is then increased sufficiently to again energize the relay 140 and cause it to pull in. When this occurs, the connection between the movable relay contact 140a and the fixed contact 140b is broken thereby de-energizing the relay 135 so that it can drop out thereby effecting re-engagement of its contacts 135d with 135b and 135c with 135a, to the end that connection between the lines 131 and 136 and between the lines 132 and 138 is re-effected whereby to re-establish rotation of the motor 36 in a forward or electrode-tool feeding direction.

The control of motor reversal directly from the integrator circuit 100, which provides error information to the signal winding 95a of the magnetic amplifier 95, permits reversal to be effected without the normal control cycle response time of the magnetic amplifier being added to the response time of the reversing relay.

In addition to its rectifying function, whereby to provide a unidirectional voltage for application to the armature 36A of the motor 36, the bridge rectifier 130 serves to isolate the armature 36A of the motor 36 from the magnetic amplifier 95 so that the effect inductance of the load, i.e., the motor armature 36A, is eliminated.

To permit the proper operational speed of the motor to be selected within its operational range, the magnetic amplifier 95 includes a bias winding 95c. A biasing voltage is applied to the bias winding 95c by way of a lead 144 which is connected to the arm of a potentiometer 145. The potentiometer 145 is connected between ground and the junction between the resistors 87 and 88 of the voltage divider and filter network 86—90. By shifting the arm of the potentiometer 145 throughout its range, it is possible to attain a desired rotational speed for the motor 36 as predetermined by the operator of the device according to the spark machining area and power involved.

Referring now to the form of the invention schematically illustrated in Fig. 3 of the drawings, it will be seen that the circuits incorporated in the spark energy source are identical with those previously described and hereinbefore shown in Fig. 2. Therefore, the same description will suffice and the same reference numerals for the various components thereof have been included in Fig. 3.

As with the first form of the invention illustrated and described, in this form too relative positioning of the electrode-tool T and the workpiece W so as to maintain optimum operating gap spacing therebetween is controlled by a signal derived directly from the spark gap voltage. This signal results from integrating the spark gap voltage and applying the resulting integrated signal so as to control the output of a magnetic amplifier. The output of the magnetic amplifier is applied to the armature of the drive motor 36 in order to effect forward or feeding movement toward each other of the electrode-tool T and the workpiece W. So, too, in this form of the invention rapid correction of intermittent or short circuited operating conditions is contemplated by applying full supply power to the armature independently of the magnetic amplifier output.

As the following description proceeds, similar reference characters will be utilized for similarly functioning components beginning with the reference numeral 284 for the full wave rectifier which corresponds to the full wave rectifier 84 of the form of the invention shown in Fig. 2. By way of further example the reversing relay will bear reference numeral 335 and its corresponds in form and function to the reversing relay 135 of the first illustrative form of the invention. Thus, in Fig. 3 the direct current type feed motor 36 has its field winding 36F continuously energized from the full wave rectifier 284 by way of a voltage divider and filter network 386—290.

This form of the spark gap spacing control includes an integrator circuit generally designated 300 in which provision is made to restrict the voltage applied to the signal winding of the magnetic amplifier 295. This restricts the winding current during open circuit condition. It also increases the range of control with respect to the selected operating point by compressing the signal variation from that at the normal gap spacing to that during open circuit. It will be recalled that in the first form of the invention illustrated and described herein that to accommodate the several spark machining powers available from the spark energy source 26 and thus to accommodate the widely varying applied signal several resistors and an appropriate switching arrangement was utilized for alternatively incorporating the resistors in the circuit and thereby altering the integrator charging time constant. In the present instance, however, but a single integrator charging time constant is utilized. To accommodate the widely varying applied signal, means is provided with is effective to shunt excess signal to ground and thereby restrict the signal voltage applied to the control or signal winding 295a of the magnetic amplifier 295.

The magnetic amplifier 295 has an excitation and output winding 295b. The opposite ends of the winding 295b are connected together and to one side of the AC supply (85b) by way of the line 315. The contiguous ends of the winding 295b are connected by means of half wave rectifiers 325 and 326 so that the amplifier operates in push-pull condition. The output of the magnetic amplifier 295 is manifested by way of a line 328 across a rectifier bridge 330 to ground. From the rectifier bridge by way of leads 331 and 332, a unidirectional voltage is applied to the fixed contacts 335a and 335b of a reversing relay 335. The reversing relay 335 is normally de-energized, and in such condition its movable contacts 335c and 335d are engaged with the contacts 335a and 335b respectively. As a result, the positive line 331 from the rectifier bridge 330 is connected to the motor armature 36A by way of a lead 336 and the negative line 332 from the bridge 330 is connected to the motor armature 36A by way of a line 338 so as to effect rotation of the motor 36 to feed the tool T of the illustrative device toward the workpiece W.

To permit the proper operational speed of the motor 36 to be selected within its operational range, the magnetic amplifier 295 is provided with a predetermined variable bias voltage. In the present instance the bias voltage is applied to the signal winding 295a of the magnetic amplifier 295 in order to improve the response time of the magnetic amplifier as compared to that in the first form of the invention shown. The bias voltage is applied by way of a resistor 343 and a lead 344 which is connected to the arm of a potentiometer 345. The potentiometer 345 is connected between ground and the junction between the resistors 287 and 288 of the voltage divider and filter network 286—290. By shifting the arm of the potentiometer 345 throughout its range it is possible to attain an operational range of rotational speed for the motor 36 as predetermined by the operator of the spark machining device in which the instant control is incorporated according to the spark machining area and power, i.e., material removal rate, involved.

Gap voltage is supplied to the spark gap spacing control by way of a line 302 which may be of coaxial form with its central conductor connected between the spark machining main $M_1$, for the workpiece W, and the cathode terminal of a rectifier 304. The outer conductor of the line 302 serves as a grounded shield and is connected to the spark machining main $M_2$, for the tool T. The rectifier 304 passes only positive voltage signals. In addition it serves to isolate the integrator circuit 300 from the spark gap G.

The integrator circuit 300 includes a capacitor 305, a charging resistor 306, and resistors 307 and 308. In addition there is included a controlled discharge device here shown in the form of a triode 309. This triode is of the low-mu type and its plate is connected between the resistors 307 and 308. The grid of the triode is provided with a fixed negative bias from the reference supply 284—290 by way of resistors 310, 311 and 312. Its cathode is grounded. Thus the illustrative controlled discharge device is in shunt impedance relation with the integrator circuit. The negatively biased grid effectively operates to permit the triode to conduct only in conditions approaching open circuit operation of the spark gap, that is to say the tube conducts so as to provide a parallel path or shunt impedance to ground only when the voltage signal appearing at its plate increases beyond a predetermined point, and this device conducts increasing amounts of current as its plate potential increases.

It will be seen that the resistors 307 and 308 are in series with the signal winding 295a of the magnetic amplifier 295 and are connected to the high or positive side of the integrator capacitor 305. The combined values of these two fixed resistors and the resistance of the signal winding 295a of the magnetic amplifier 295 thus determined the discharge time constant of the signal integrator network. Under condition of normal cutting operation of the spark machining device, when the triode has a plate potential that does not permit it to conduct, a normal time constant as determined by the aforementioned resistances and capacitor 305 is effective.

When, however, an open circuit condition at the spark gap G obtains, as a result of too wide a spacing between the electrode-tool T and the workpiece W, there is manifested a sharp increase in potential between the spark machining mains $M_1$ and $M_2$ and thus, by way of the line 302, and the preceding portion of the integrator circuit, at the plate of the triode. As a result the triode becomes conductive. Because of the degree of conduction of the triode is a function of its plate potential and because the triode is connected at the junction between the two resistors 307 and 308 in the integrator circuit 300, there is established a path for current flow from the integrator capacitor to ground which parallels the path to ground comprising the resistor 308 and the control signal winding 295a of the magnetic amplifier. It will also be apparent that the effective resistance or impedance of the controlled discharge device varies in a manner that maintains a relatively constant voltage at its plate or anode. As a result of the conduction of the triode 309 a voltage drop appears across the resistor 307.

Thus under a condition of open circuit operation of the spark machining device, during which condition the triode conducts, the discharge time constant of the integrator circuit is automatically corrected. As a result there is provided a positive and a substantially fixed limit to the voltage that can appear across the signal winding 295a of the magnetic amplifier 295. While a controlled discharge device in the form of a low-mu high-vacuum triode has been illustrated and described it will be apparent that numerous other electric discharge means can readily be substituted therefor.

In practice it has been possible to establish a substantially linear relationship between open circuit condition of operation, normal cutting condition of operation, and intermittent or short circuit condition of operation in the signal voltage appearing across the signal winding 295a of the magnetic amplifier. It has been observed that with the foregoing arrangement a signal voltage appearing across the magnetic amplifier signal winding 295a with the triode 309 conducting, as when the spark machining device is operating under open circuit condition is 3 volts; two volts with the tube not conducting and under normal or optimum cutting operation; and 0.75 volt during an operating condition of a short circuited gap G. With the ratio of signal available under these three operating conditions that are to be expected during the operation of the spark machining device, the magnetic amplifier is thus provided with a range of ampere-turns control permitting it to function in the most efficient manner consistent with the characteristics of the particular magnetic amplifier that is utilized.

As hereinbefore noted, this form of the invention incorporates provision for rapid correction of intermittent or short circuited spark gap operating conditions by properly applying full supply power to the armature 36A of the motor 36 independently of the magnetic amplifier output. Thus, if the spark gap spacing becomes too small the instant spacing control operates to effect reversal of the direction of rotation of the motor 36 so as to rapidly withdraw the electrode-tool with respect to the work thereby to increase spark gap spacing. To this end means is provided for sensing a gap spacing reduction below the desired range and for effecting operation of the reversing relay 335 so as to produce motor rotation in the opposite direction by properly applying full supply voltage thereto. It will be seen from Fig. 3 that the relay 335 includes an additional set of fixed contacts 335e and 335f. The contact 335e is connected directly to ground. The contact 335f is connected to the line 291 by means of which DC power is supplied from the voltage divider and filter network 286—290. Thus, when the relay 335 is energized, the connections between its contacts 335e and 335a and between its contacts 335d and 335b are broken, and connection is established between the relay contacts 335c and 335e and between 335d and 335f, respectively.

To effect the operation of the relay 335, means including a relay 350 is utilized. The operating coil of the relay 335 has one end connected to ground and the other end connected to the movable contact 350a of the relay 350. The fixed contact 350b is connected to the A.C. supply line 315.

The use of the same winding 295a for bias and control signal voltages in order to affect operation of the magnetic amplifier 295 necessitates a separation of the magnetic amplifier signal integrator circuit and the reversing relay operating relay 350 so as to prevent bias current from affecting the operating point of the relay 350. For this purpose a separate integrator circuit is utilized for deriving a signal for application to the coil of the relay 350 to operate the same. This integrator circuit is supplied by way of a rectifier 355 which has its plate connected to the center conductor of the signal supply line 302. It includes resistors 356, 357, 358, 359 and 360 and a capacitor 361.

It will be recalled from the description of the spark energy source 26 of the instant device that in the first two or high power positions of the switches 60, 61 and 62 the spark energy source is effective to supply high energy, time-spaced, voltage pulses, and that there is a considerable interval of time between successive energy discharges when substantially no voltage appears across the gap G. Thus, during that time interval substantially no signal voltage appears on the line 302. The relay 350 is so chosen that for a desired or normal cutting condition of operation of the device, there must be sufficient signal provided for energizing its coil so that the relay is held in and its contacts 350a and 350b are maintained separated. In order to provide this energizing signal for the relay 350 during the interval of time between successive refirings of the ignitron 65, and thus discharges of the capacitors 50 and 52 across the gap G, or into the capacitor 70 in the case of an open circuit condition when the gap G is too wide for spark discharge across it, the integrator circuit for supplying the energizing signal to the coil of the relay 350 utilizes the capacitor 361 and the discharge time constant thereof is respectively determined by the resistors 357, 358 and 360 according to the position of selector switches, generally designated 362 and 363. The switches 362 and 363 are ganged for operation with the switches 60, 61 and 62. The movable contacts of the switches 362 and 363 are connected together. The fixed contacts 362a and 362b are respectively connected to the resistors 357 and 358, the latter being in the form of potentiometers so as to permit of adjustment. Both of the contacts 363a and 363b are connected to the high or positive side of the capacitor 361, and the other side of the capacitor is grounded. It will be seen, therefore, that when the ignitron 65 fires, so as to discharge either or both of the capacitors 50 and 52, according to the positions of the switches 60, 61 and 62, energy is also applied to the integrator circuit which includes the capacitor 361. The discharge time of the capacitor 361 is determined by the sum of the resistances 357 and 360 or 358 and 360 according to the positions of the switches 362 and 363.

When the switches 60, 61 and 62 are operated into the "c" positions thereof, the spark energy source 26, it will be recalled, becomes a relaxation type circuit and the energy pulses are closely spaced without long intervals of time therebetween. Therefore in position "c" it becomes unnecessary to include the capacitor 361 to provide a sufficient signal for maintaining the relay 350 held-in under normal operating conditions.

Regardless of the position of the switches 60, 61, 62, however, when a short circuit condition occurs, as by the electrode-tool T approaching the workpiece W too closely or under intermittent operating conditions as when the operating gap becomes partially clogged with particles of material that have been removed from the work, the gap voltage drops. So, too, the voltage applied to the integrator circuit for the relay 350 drops and insufficient signal is developed across the integrator circuit and applied to the coil of the relay 350 with the result that the relay drops out. As a result its movable contact 350a engages its fixed contact 350b and supply voltage from the line 85b by way of the line 315 is applied to the coil of the relay 335 so as to energize this relay. When this occurs the movable contacts 335c and 335d of the relay 335 break the connection between the lines 331 and 336 and between the lines 332 and 338 and at the same time effect a connection between the contacts 335c and 335e and between the contacts 335d and 335f. As a result the D.C. supply voltage which is carried by the line 291 from the voltage divider and filter network 386—290 is applied to the motor armature by way of the line 336 and 338 so as to effect reverse rotation of the motor and thus withdrawal movement of the electrode-tool T with respect to the workpiece W and thereby the short circuit operating condition or intermittent operating condition is quickly alleviated.

When the spark gap spacing has been increased sufficiently far, upon successive pulses from the spark energy source the spark gap voltage again increases and a larger signal is developed across the integrator circuit 355–363 and is applied to energize the coil of the relay 350 thereby to cause it to pull in. When the relay 350 pulls in, the connection between its movable contact 350a and its fixed contact 350b is broken, thus interrupting the application of energizing power to the coil of the relay 335. When this occurs the relay 335 drops out and thereby is effected re-enagegement of its contacts 335d with 335b and 335c with 335a to the end that connection between the lines 331 and 336 and between the lines 332 and 338 is reestablished. Thus, the output of the magnetic amplifier 295 by way of the rectifier bridge 330 is again applied to the armature 36A of the motor 36, and rotation of the motor 36 in a forward or electrode-tool feeding direction is again effected.

It will be apparent that either of the illustrative control systems comprising the present invention permits of use with various mechanical drive assemblages. In so doing, however, it has been observed that variations in the mass of electrodes and in the associated mechanical elements including the speed-reduction gear train can produce undesirable results. For example, if the mass to be moved is appreciable as when large electrodes are utilized or in applications where it is desirable to move a relatively heavy workpiece with respect to a fixed electrode-tool, there is manifested a tendency for the moving element to overrun. Variations in the weight of the moved mass adversely affect any counterbalancing that might be employed and as a result there is presented to the feed control means the problem of accommodating such variations in rates presented to it by the output of the magnetic amplifier.

Indeed if the magnetic amplifier output reduces from 80 volts to 20 volts the drive motor becomes a generator and 80 volts will continue to appear across the armature until the kinetic energy in the system is dissipated as resistive losses in the system. Therefore the motor cannot closely follow variations in magnetic amplifier output. From an inspection of the illustrative feed assembly, it will be apparent that any tendency to overrun or to lag behind will be manifested in the rate of rotation of the shaft of the drive motor 36. Desirably, a drive motor is utilized which is somewhat larger than is actually required to overcome the mechanical and frictional forces in the system so as to increase mechanical response. Thus the mass of the motor armature is a considerable factor in the system, and any damping that is to be applied need be applied at the motor armature and need be only of sufficient magnitude to overcome armature inertia since the effect of variations in electrode weight, gearing mass, etc., farther along are minimized in their effect on the armature by the amount of gear reduction.

The present invention further contemplates the provision of means for damping overrun that has an effectiveness proportional to the rotational velocity of the armature. To this end a rotary gear pump 370 is coupled directly to the armature shaft of the drive motor 36. A gear pump is preferably utilized because of its relatively low slippage. The pump 370 is arranged to move hydraulic fluid in a closed hydraulic system which comprises an output line 372 feeding a variable orifice or needle valve 374 and a return line 375. The pump itself is preferably of the type that is provided with a pressure regulating device which defines a limit in the maximum amount of torque load that can be applied to the drive shaft. In operation the variable orifice valve is adjusted until the system approaches critical damping. In practice this can be achieved by allowing the drive motor 36 to be fed with full input armature voltage and the variable orifice valve adjusted until an appreciable reduction in the rate of rotation of the motor from its free running rated value is attained. Therefore, it will be seen that the motor 36 always operates in the forward direction under some load as applied by the pump 370. It will also be apparent that the percentage of damping applied in this manner is directly proportional to the hydraulic pressure generated by the pump since this is proportional to the rotational velocity of the pump.

When the rotation of the drive motor 36 is reversed it is desirable to remove the torque load of the pump from the motor shaft. The purpose of this is obviously to permit the motor to rotate reversely at top speed so as to quickly separate the electrode-tool and the workpiece This is achieved quite simply by providing a bypass around the adjustable orifice valve. As shown this bypass is in the form of a cross line 376 which includes a check valve 377 which may conveniently be of the ball-check type. This bypass offers little resistance to hydraulic fluid flow when the pump is operating in a reverse direction in which direction it is driven by the reversely rotating motor 36. However, the check valve seats upon forward operation of the motor and pump.

From the foregoing, therefore, it will be apparent that a feed control for spark machining apparatus constructed in accordance with the teachings of the present invention is a continuously operable control assuring the maintenance of the spark gap at a predetermined optimum spacing by utilizing the applied impulse between the workpiece and the electrode-tool as a source of control signal. It can accommodate a wide variation of impulse energy not only as occasioned by the application of different energies from a spark energy source but also as encountered between an open circuit operating condition, a normal cutting operating condition, and short circuit operating condition as encountered during the operation of the spark machining device. Additionally it permits of the accommodation of a wide range of electrode-tool or workpiece weights without overrun and without necessitating reduction in the sensitivity or gain of the control system.

I claim as my invention:

1. In a spark machining apparatus having a spark energy source for applying time-spaced spark discharges across a gap between an electrode-tool and a workpiece and having a feed mechanism including a drive motor for effecting relative movement between the electrode-tool and workpiece to determine the gap spacing, a spark gap spacing control for providing a motor control voltage comprising, in combination, a magnetic amplifier, means for providing an adjustable bias signal for said magnetic amplifier for determining a desired normal operating voltage-signal, and means including an integrator circuit adapted for connection with the workpiece and being connected to said magnetic amplifier for deriving a control signal for said magnetic amplifier from the spark gap voltage for correspondingly varying the output thereof whereby motor operating speed can be controlled.

2. In a spark machining apparatus having a spark energy source for applying time-spaced spark discharges across a gap between an electrode-tool and a workpiece which discharges are alternatively of relatively high energy and at a low repetition rate and relatively lower energy at a higher repetition rate and having a feed mechanism including a drive motor for effecting relative movement between the electrode-tool and the workpiece to determine the gap spacing, a spark gap spacing control for providing a control voltage for the drive motor, said control comprising, in combination, an amplifier, means including an integrator circuit adapted for connection with the workpiece and being connected to said amplifier for deriving a control signal for said amplifier from the spark gap voltage, means for providing a biasing signal for said amplifier, and means for correlating the operation of said integrator circuit to the spark discharge forms from the spark energy source applied to the gap.

3. In a spark machining apparatus having a spark energy source for applying time-spaced spark discharges across a gap between an electrode-tool and a workpiece which discharges are alternatively of relatively high energy and at a low repetition rate and relatively lower energy at a higher repetition rate and having a feed mechanism including a drive motor for effecting relative movement between the electrode-tool and the workpiece to determine the gap spacing, a spark gap spacing control for providing a control voltage for the drive motor comprising, in combination, a magnetic amplifier, means including an integrator circuit adapted to be connected to the workpiece and being connected with said magnetic amplifier for deriving a control signal for said magnetic amplifier from the spark gap voltage, means for providing a biasing signal for said magnetic amplifier, and means for altering the charging time constant of said intergrator circuit to accommodate the alternative forms of spark discharge applied from the spark energy source across the gap.

4. In a spark machining apparatus having a spark energy source for applying time-spaced spark discharges across a gap between an electrode-tool and a workpiece and having a feed mechanism including a drive motor for effecting relative movement between the electrode-tool and workpiece to determine the gap spacing, a spark gap spacing control for providing a control voltage to the drive motor, said control comprising, in combination, an amplifier, means including an integrator circuit for deriving a control signal for said amplifier from the spark gap voltage, means for providing a biasing signal for said amplifier, said integrator circuit including a capacitor, a charging resistor and a discharge resistor and means for restricting the value of the integrated signal applied to said amplifier.

5. In a spark machining apparatus having a spark energy source for applying time-spaced spark discharges across a gap between an electrode-tool and a workpiece and having a feed mechanism including a drive motor for effecting relative movement between the electrode-tool and workpiece to determine the gap spacing, a spark gap spacing control for supplying a control voltage for the drive motor to effect rotation thereof, said control comprising, in combination, an amplifier, means including an integrator circuit for deriving a control signal for said amplifier from the spark gap voltage, and means for supplying the output of said amplifier as the control voltage, said integrator circuit including a capacitor, a charging resistor and a discharge resistor and means for restricting the value of the integrated signal applied to said magnetic amplifier, said last-mentioned means comprising a controlled discharge device providing an impedance in shunt with said integrator circuit which becomes effective when the integrated signal tends to exceed a predetermined value.

6. In a spark machining apparatus having a spark energy source for applying time-spaced spark discharges across a gap between an electrode-tool and a workpiece and having a feed mechanism for effecting relative movement between the electrode-tool and workpiece to determine the gap spacing, a spark gap spacing control for providing a control voltage for the feed mechanism for operating the same, said control comprising, in combination, a magnetic amplifier, means including an integrator circuit for deriving a control signal for said magnetic amplifier from the spark gap voltage, and means for supplying the output of said magnetic amplifier as the control voltage whereby to effect relative feed movement of the feed mechanism, said integrator circuit including a capacitor, a charging resistor and a discharge resistor and means for restricting the value of the integrated signal applied to said magnetic amplifier, and said last mentioned means comprising a triode, having a negatively biased grid, providing an impedance in shunt relation to ground with said discharge resistor and magnetic amplifier control winding when the integrated signal is of a sufficient value to cause said triod to conduct.

7. In a spark machining apparatus having a spark energy source for applying time-spaced spark discharges across a gap between an electrode-tool and a workpiece and having a feed mechanism including a drive motor for effecting relative movement between the electrode-tool and the workpiece to determine the gap spacing, a spark gap spacing control for providing a motor-actuating voltage signal, said control comprising, in combination, an amplifier, means including an integrator circuit for deriving a control signal for said amplifier from the spark gap voltage, means for supplying the output of said amplifier as the actuating signal, whereby to effect feeding movement by the feed mechanism, and means responsive to a drop in gap voltage below a predetermined value for interrupting the supply of amplifier output and for substituting supply voltage as the actuating signal whereby to operate the feed mechanism to separate the electrode-tool and the workpiece, said last mentioned means including a relay normally energized by the integrated signal.

8. In a spark machining apparatus having a spark energy source for applying time-spaced spark discharges across a gap between an electrode-tool and a workpiece and having a feed mechanism for effecting relative movement between the electrode-tool and the workpiece to determine the gap spacing, a spark gap spacing control for providing a control voltage signal for the feed mechanism, said control comprising, in combination, an amplifier, means including an integrator circuit for deriving a control signal for said magnetic amplifier from the spark gap voltage, means including a normally de-energized relay for supplying the output of said magnetic amplifier as the control voltage signal whereby to effect forward operation of the feed mechanism, and means responsive to a drop in gap voltage below a predetermined value for energizing said relay for interrupting the supply of magnetic amplifier output as the control voltage signal and for alternatively providing supply voltage as the control voltage signal for reversely operating the feed mechanism to separate the electrode-tool and the workpiece.

9. In a spark machining apparatus having a spark energy source for applying time-spaced spark discharges across a gap between an electrode-tool and a workpiece and having a feed mechanism for effecting relative movement between the electrode-tool and the workpiece to determine the gap spacing, a spark gap spacing control for providing feed control voltage for the feed mechanism, said control comprising, in combination, an amplifier, means including an integrator circuit for deriving a control signal for said amplifier from the spark gap voltage, means including a normally de-energized relay for supplying the output of said magnetic amplifier as the feed control voltage whereby to effect forward operation of the feed mechanism, and means responsive to a drop in gap voltage below a predetermined value for energizing said relay for interrupting the supply of amplifier output as the feed control voltage and for alternatively providing full supply voltage as the control voltage, whereby operation of the feed mechanism can obtain to separate the electrode-tool and the workpiece, said last mentioned means comprising a second relay normally energized to maintain its contacts open and dropping out to close its contacts when the spark gap voltage falls below a predetermined value for energizing said first mentioned relay.

10. In a spark machining apparatus having a spark energy source for applying time-spaced spark discharges across a gap between an electrode-tool and a workpiece and having a feed mechanism for effecting relative movement between the electrode-tool and workpiece to determine the gap spacing, a spark gap spacing control for providing feed control voltage for the feed mechanism, said control comprising, in combination, a magnetic amplifier, means including an integrator circuit for deriving a control signal for said magnetic amplifier from the spark gap voltage, means for providing a biasing signal and applying the same to the control signal winding of said magnetic amplifier, means including a first relay normally de-energized for supplying the output of said magnetic amplifier as the feed control voltage signal, means including a second relay for energizing said first relay and including a second integrator circuit for deriving an energizing signal for said second relay from the spark gap voltage, said second relay when energized having its contacts open so as to maintain said first relay normally de-energized, and said second relay dropping-out when its energizing signal falls below a predetermined value with a drop in gap voltage whereby said first relay is energized to interrupt the supply of magnetic amplifier output.

11. In a spark machining apparatus having a spark energy source for applying time-spaced spark discharges across a gap between an electrode-tool and a workpiece and including a feed mechanism for effecting relative movement between the electrode-tool and the workpiece, a spark gap spacing control for providing feed control voltage for the feed mechanism, said control comprising, in combination, a magnetic amplifier, means for deriving a control signal voltage for said magnetic amplifier from the voltage across the gap, means normally conditioned for supplying the output of said magnetic amplifier directly as the feed control voltage whereby to effect relative feeding movement between the electrode-tool and the workpiece, said last mentioned means being responsive to a drop in the voltage across the gap below a predetermined value for interrupting the supply of magnetic amplifier output as the feed control voltage and for substituting therefor full supply voltage whereby to effect rapid separating movement between the electrode-tool and the workpiece.

12. In a spark machining apparatus having a spark energy source for applying time-spaced spark discharges across a gap between an electrode-tool and a workpiece and including a feed mechanism having a D.C. drive motor with a continuously excited field for effecting relative movement between the electrode-tool and the workpiece, a spark gap spacing control comprising, in combination, a magnetic amplifier, an integrator circuit adapted for connection with the workpiece and being connected to the control winding of said magnetic amplifier for deriving a control signal for said magnetic amplifier from the gap voltage, and means including a rectifier bridge for providing from the output of said amplifier a unidirectional armature voltage signal whereby to effect the feed mechanism operation to produce relative feeding movement between the electrode-tool and the workpiece.

13. In a spark machining apparatus having a spark energy source for applying time-spaced spark discharges across a gap between an electrode-tool and a workpiece and including a feed mechanism having a D.C. motor with a continuously excited field for effecting relative movement between the electrode-tool and the workpiece, a spark gap spacing control for providing armature voltage for the motor, said control comprising, in combination, a magnetic amplifier, an integrator circuit adapted for connection to the workpiece and being connected with said magnetic amplifier for deriving a control signal for said magnetic amplifier from the gap voltage, means including a rectifier bridge for deriving a unidirectional armature voltage signal from said magnetic amplifier output whereby the feed mechanism can produce relative feeding movement between the electrode-tool and the workpiece, and means responsive to a drop in the voltage across the gap below a predetermined value for interrupting said unidirectional armature voltage signal and for alternatively providing full supply voltage as the armature voltage signal whereby the feed mechanism can be operated to rapidly separate the electrode-tool and the workpiece.

References Cited in the file of this patent

UNITED STATES PATENTS

| | | |
|---|---|---|
| 2,761,050 | Ballhausen | Aug. 28, 1956 |
| 2,762,946 | | |
| 2,773,168 | | |
| | Manchester | Sept. 11, 1956 |
| | Williams | Dec. 4, 1956 |

FOREIGN PATENTS

| | | |
|---|---|---|
| 1,065,986 | France | Jan. 13, 1954 |
| 1,062,480 | France | Dec. 9, 1953 |
| 748,544 | Great Britain | May 2, 1956 |